United States Patent [19]

Leight

[11] 3,856,007

[45] Dec. 24, 1974

[54] EAR PROTECTOR ASSEMBLY

[76] Inventor: Howard S. Leight, 16027 Northfield St., Pacific Palisades, Calif. 90272

[22] Filed: Apr. 2, 1973

[21] Appl. No.: 346,746

[52] U.S. Cl. ............................ 128/152, 2/3 R
[51] Int. Cl. .................................. A61f 11/00
[58] Field of Search ........ 128/152, 132, 151; 2/3 R, 2/3 C, 185, 209; 179/182, 107 S; 181/23

[56] References Cited
UNITED STATES PATENTS

| | | | |
|---|---|---|---|
| 280,005 | 6/1883 | Beard et al. | 2/185 R |
| 1,167,368 | 1/1916 | Adams-Randall | 128/152 |
| 1,225,422 | 5/1917 | Feher | 128/152 |
| 3,016,054 | 1/1962 | Rosenblatt | 128/152 |
| 3,297,832 | 1/1967 | Brown | 181/23 |

Primary Examiner—Richard A. Gaudet
Assistant Examiner—Henry J. Recla
Attorney, Agent, or Firm—Lindenberg, Freilich, Wasserman, Rosen & Fernandez

[57] ABSTRACT

An ear protector assembly which can be easily put on and removed, including a mount which is readily attached to the temple bar of an eyeglass frame, an arm having an inner end pivotably connected to the mount, and an earplug fixed to an outer end of the arm. The mount has fasteners that enable a workman to clamp the mount at a location along the temple bar wherein the earplugs properly enter his ears, and thereafter every time he puts on his eyeglasses and pivots the arms inwardly the earplugs will properly enter his ears. The earplug assemblies are primarily useful for mounting on safety glasses, so that a workman has to put on only one apparatus to simultaneously protect his eyes and ears.

3 Claims, 4 Drawing Figures

PATENTED DEC 24 1974　　　　　　　　　3,856,007

EAR PROTECTOR ASSEMBLY

BACKGROUND OF THE INVENTION

Ear protectors for blocking out loud noises are often worn by workmen who also must wear eyeglasses to protect their eyes and/or to correct for faulty vision. Such ear protectors, which normally include a band that fits over the head to support a pair of earplugs, are often considered inconvenient and annoying to workmen. This is because the ear protector constitutes another bulky item which has to be put on and taken off, and also because the bands are often annoying to adjust and often slip from the proper position.

SUMMARY OF THE INVENTION

In accordance with one embodiment of the present invention, an ear protector assembly is provided which can be mounted on eyeglasses, so that the eyeglass frame holds the earplugs in place on the workman or other wearer and eliminates the need to handle and store a separate ear portector device. Furthermore, the assembly permits rapid and accurate insertion of the earplug into the ear whenever the eyeglass frame is worn. The ear protector assembly includes a mount that can be attached to a temple bar of an eyeglass frame, an arm pivotably connected at one end to the mount, and an earplug mounted at a second end of the arm. The assemblies are utilized in pairs, one attached to each temple bar of the eyeglass frame. A workman handles his eyeglasses and the ear protector assemblies thereon as a single unit, first placing the ear loops of the temples bars over his ears and then pivoting the arms so that earplugs enter his ears. The mount of each assembly is slideable along the temple bar and can be permanently clamped in a desired position therealong, so that the workman does not have to make any adjustment each time he puts on the eyeglasses other than to pivot the arms into position. The mount has a pair of walls that form a part-spherical socket, and the arm has a ball which is held in the socket and which is large enough to resiliently spread the socket walls apart so that there is high friction to retain the arm in any position to which it is pivoted. The fact that only pivotal movement is involved in moving the earplugs into position each time the ear protector is used, means that smooth operation can be attained in a low cost device.

The novel features that are considered characteristic of the invention are set forth with particularity in the appended claims. The invention will best be understood from the following description when read in conjunction with the accompanying drawings.

DESCRIPTION OF THE PREFERRED EMBODIMENTS

Figure 1:
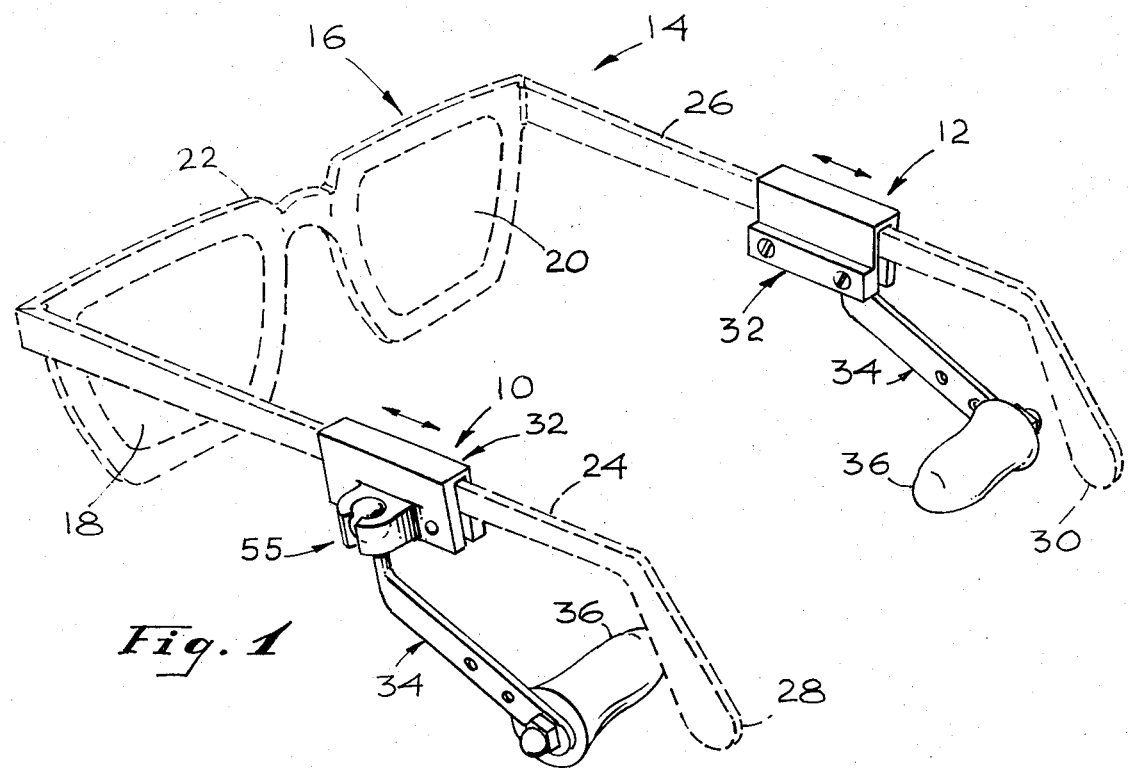
FIG. 1 is a perspective view of ear protector assemblies constructed in accordance with the invention, shown mounted on an eyeglass.

FIG. 1 illustrates a pair of ear protector assemblies 10, 12 that are mounted on an eyeglass 14 that includes an eyeglass frame 16 and a pair of shatter resistant lenses 18, 20. The lenses 18, 20 may be of zero corrective power for those workmen or other wearers not otherwise requiring eyeglasses, and may be of a shape that corrects for vision defects for those workmen that require it. The frame includes a front section 22 that mounts on the bridge of the nose and a pair of temple bars 24, 26 hinged to the front section and having a pair of ear loops 28, 30 that loop over the ears. Each ear protector assembly includes a mount 32 that is attached to a temple bar of the eyeglass frame, an earplug holder or arm 34 which is connected to the mount 32, and an earplug 36 that fits into an ear of the wearer. The two ear protector assemblies 10,12 are identical, but each is assembled with the earplug 36 mounted on the side of its arm 34 which faces the wearer.

Figure 2:
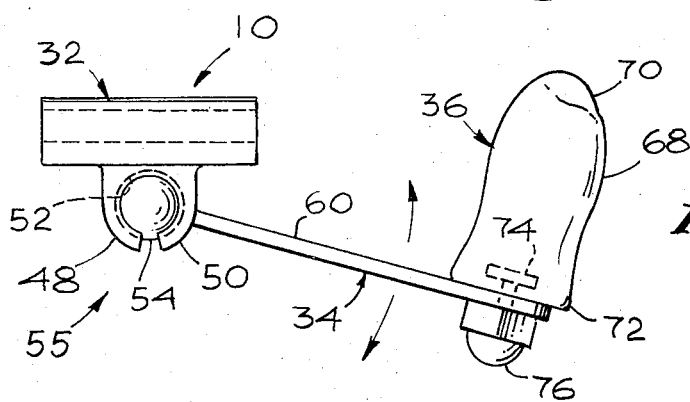
FIG. 2 is a plan view of an ear protector assembly of FIG. 1.
Figure 3:
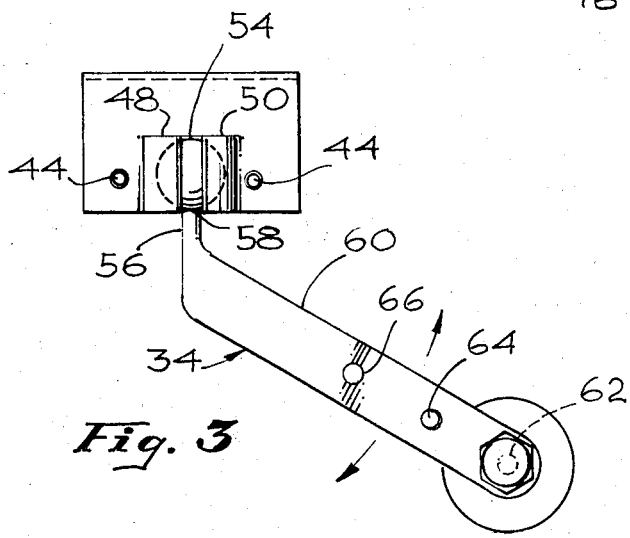
FIG. 3 is a side elevation view of the ear protector assembly of FIG. 2.
Figure 4:
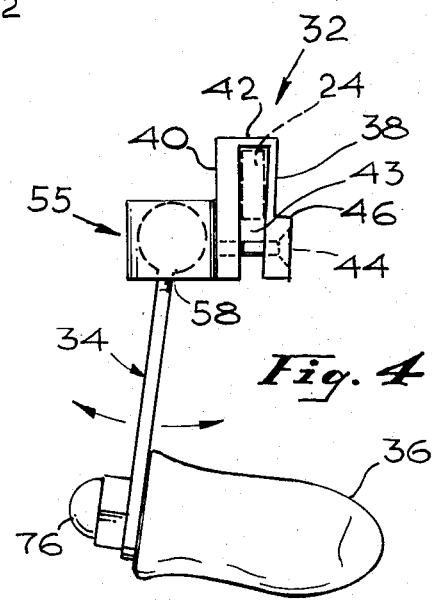
FIG. 4 is a rear elevation view of the ear protector assembly of FIG. 2.

As also illustrated in FIGS. 2-4, the mount 32 has three walls, including an inside wall 38 (FIG. 4), an outside wall 40, and a connecting wall 42 at the top. These walls form a slot 43 that receives the temple bar 24 of the eyeglass frame. The mount is of a resilient material such as a typical low cost plastic, and the walls 38, 42 are thin enough to deflect and clamp against the temple bar 24. A pair of screws 44 extending between the two walls 38, 40 can draw the walls together to clamp the mount at any position along the temple bar 24. The inner wall 38 has an inwardly extending wall portion 46 through which the screw 44 extend. The portion 46 can contact the temple of the workman or other wearer to spread the temple bars 24, 26 slightly further apart than normal; this can result in more inward force against the temples of the wearer to stabilize the eyeglasses on the wearer when the earplugs are in his ear.

The mount 32, has a pair of bearing or socket walls 48, 50 that form a recess or socket 52 that is part of a sphere. The arm 34 has a ball 54 at the inner end thereof which is held in the socket 52, to form a universal coupling 55. Accordingly, the arm 34 is universally pivotable on the mount; that is, it can pivot in any direction about the center of the ball 54. The arm 34 has an inner end portion 56 which extends downwardly from the ball 54 through an opening 58 at the bottom of the socket to help stabilize the arm position, and has an outer end portion 60 that extends rearwardly from the bottom of the inner portion 58. The outer portion 60 is of strip-like shape and has three holes 62, 64, 66 extending therethrough. The earplug 36 includes a pod 68 with a tip portion 70 that fits partially into the ear canal of the wearer, and a flat base portion 72 that lies flush against the face of the outer arm portion 60. A screw 74 is embedded in the pod and has a threaded shank that extends through one of the holes 62 in the arm. A nut 76 threaded onto the screw 74 holds the earplug securely to the arm 34.

The ear protector assembly 10 is mounted on the temple bar 24 by slipping the mount 32 through the ear loop 28 or by removing the screws 44, hanging the mount on the straight portion of the temple bar, and reinstalling and partially tightening the screws. The workman then places the eyeglass frame 16 on his head and manipulates the ear protector assembly so that the tip of the earplug 36 can enter his ear canal. Such manipulation includes sliding the mount 32 along the temple bar 24 and pivoting the arm 34. It also may be necessary to install the earplug 36 in a different one of the three holes 62–64 of the arm. After the assembly is in a configuration wherein the earplug properly enters the ear, the workman pivots the arm 34 outwardly to remove the earplug, takes off the eyeglasses, and tightens the screws 44. The position of the mount is then securely fixed along the temple bar, to facilitate subsequent use of the apparatus.

When the workman begins work in an environment which requires eye and ear protection, he merely picks up the eyeglass and ear protector assembly, places it on his head with the ear loops 28, 30 looped over his ears, and then pivots the arms 34 of the ear protector assemblies inwardly. The universal joint 55 formed by the ball 54 and socket 52 permits considerable manipulation by the workman to firmly seat the tip of the earplug in his ear, and yet the workman is assured of bringing the earplug to his ear canal with little effort. The socket walls 48, 50 of the mount can resiliently move apart and together a small distance and the ball 54 is of a size to maintain the walls biased apart. This results in high friction at the universal joint 55, so that the arm 34 tends to retain its position. In spite of the high friction at the joint 55, pivoting of the arm in any direction is easily accomplished by a workman.

It would be possible to construct the mount 32 so that it smoothly slides on the temple bar 24 in everday use. However, temple bars vary in thickness and height, so that it is difficult to provide a low cost mount that will smoothly slide on any temple bar. Furthermore, it is difficult to control sliding friction to maintain it at a constant level, and in fact, jamming tends to occur in low cost slider bearings where there is moderated friction. This can be contrasted with pivotal mounting wherein a moderate pivotal friction, without jamming, can be maintained with low cost parts. In adjusting the earplug positions, a workman merely has to move the arm 34 about a pivot joint, so that the action is smooth and the earplug is held against his ear after being inserted therein. The inwardly-extending wall portion 46 on each mount, which bears against the temple of the wearer, tends to spring apart the temple bars 24, 26, so that the apparatus presses with a low but definite pressure on the temple. This normally eliminates any slight looseness of the temple bars which is sometimes present in eyeglass frames that the wearer considers as properly fitting him. This slight outward spreading of the temple bars permits the earplugs to press inwardly with a slight force against the ear canal so that the earplugs are firmly seated therein. When the earplugs are fitted into the ear, they prevent forward movement of the eyeglass frame, so the frame does not slip forward onto the bridge of the nose, but is held firmly in place.

Thus, the invention provides a low cost ear protector assembly which is used in conjunction with eyeglasses so that a workman has to store and handle only one item to protect his eyes and ears, and with the bulk of the combination being only slightly greater than that of an eyeglass alone. The ear protector assembly includes a mount that can slide along the temple bar and an arm pivotably connected to the mount and carrying an earplug. The mount includes fasteners for fixing its position along the temple bar. Accordingly, a workman merely has to operate the pivot in normal use to remove and replace the earplug, the use of only pivoting for this operation resulting in smooth operation with low cost parts. While it would be possible to utilize an arm that pivots about a single axis, the use of a universal pivot makes the mount very simple and still permits rapid installation of the earplug in everyday use.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Apparatus for protecting the eyes and ears, comprising:
   an eyeglass having an eyeglass frame with a pair of temple bars, and a pair of shatter resistant lenses in the frame;
   a pair of mount members, each having a slot slideably receiving a different one of said temple bars, a fastener clamping the mount member at a selected position along the temple bar, and a pair of bearing walls resiliently moveable together and apart and forming a socket;
   a pair of arms, each having first and second ends and a ball member on said first end which is disposed in the socket formed by the bearing walls of a corresponding mount member, said ball member being large enough to maintain the bearing walls resiliently pressed apart to provide high friction with the bearing walls; and
   a pair of earplugs, each mounted on the second end of a corresponding arm.

2. Apparatus for protecting the eyes and ears, comprising:
   an eyeglass having a frame with a pair of lens openings and a pair of temple bars, the eyeglass also including a pair of lenses mounted in said lens openings;
   a pair of mounts, each mounted on a different one of said temple bars at a location spaced forward from the rear end of the temple bar to lie forward of the ear when the rear end of the temple bar lies behind the ear;
   a pair of earplug holders, each having a forward section mounted on a corresponding one of said mounts and a rearward section extending at an angle from said forward section so that the rearward section can be positioned to lie rearward of the forward section so as to lie opposite the middle of the ear; and
   a pair of earplugs, each mounted on the rearward end of a corresponding earplug holder;
   each of said mounts and the forward end of said earplug holder thereon forming a pivotal joint that allows the earplug holder to pivot with respect to said mounts and said temple bars.

3. An ear protector for mounting on an eyeglass frame that has temple bars comprising:
   a mount having a mount wall forming a slot for slideably receiving a temple bar, a fastener mounted on said mount wall and moveable towards and away from the slot to clamp the mount wall at a chosen position along a temple bar, and a pair of bearing walls mounted on said mount wall and resiliently moveable together and apart and forming a socket;

an arm having first and second ends, said first end having a ball portion which is received between said bearing walls of said mount and which holds the pair of bearing walls biased apart to provide friction that retains the arm in any position to which it is pivoted; and an earplug mounted at said second end of said arm.

* * * * *